(12) United States Patent
Payzer et al.

(10) Patent No.: US 10,191,722 B1
(45) Date of Patent: Jan. 29, 2019

(54) EVENT SYNCHRONIZATION FOR DEVELOPMENT COMPUTING SYSTEM

(71) Applicant: Microsoft Technology Licensing, LLC, Redmond, WA (US)

(72) Inventors: Gershom L. Payzer, Redmond, WA (US); Richard Michael Fox, Berlin (DE); Gregory M. Smith, Seattle, WA (US); Connor Peet, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/865,582

(22) Filed: Jan. 9, 2018

Related U.S. Application Data

(60) Provisional application No. 62/575,936, filed on Oct. 23, 2017.

(51) Int. Cl.
*G06F 9/44* (2018.01)
*G06F 8/20* (2018.01)
*H04L 12/24* (2006.01)
*G06F 8/10* (2018.01)
*G06F 8/71* (2018.01)

(52) U.S. Cl.
CPC ............. *G06F 8/20* (2013.01); *G06F 8/10* (2013.01); *H04L 41/0896* (2013.01); *G06F 8/71* (2013.01)

(58) Field of Classification Search
CPC ........................................................ G06F 9/44
USPC ................................................. 717/101–108
See application file for complete search history.

(56) References Cited

U.S. PATENT DOCUMENTS

| 5,758,093 | A | 5/1998 | Boezeman et al. |
| 6,392,613 | B1 * | 5/2002 | Goto ............... A63F 13/12 345/30 |
| 7,168,062 | B1 * | 1/2007 | Schmitter ......... G06F 8/656 717/110 |
| 7,448,024 | B2 | 11/2008 | Breeden et al. |
| 7,596,620 | B1 | 9/2009 | Colton et al. |
| 7,634,787 | B1 * | 12/2009 | Gebhardt .......... H04N 7/165 709/202 |
| 8,328,610 | B2 | 12/2012 | Shimura et al. |

(Continued)

OTHER PUBLICATIONS

"Interactive 2 Protocol Specification", Retrieved from: <<https://dev.mixer.com/reference/interactive/protocol/protocol.pdf>>, Retrieved Date: Nov. 24, 2017, pp. 1-49.

(Continued)

*Primary Examiner* — Jae U Jeon
(74) *Attorney, Agent, or Firm* — Alleman Hall Creasman & Tuttle LLP (57) ABSTRACT

An application development component of a development computing system runs a software application developed with the application development component in a pre-build preview state. A broadcast feature editing component of the development computing system changes a state of a pre-production preview version of a broadcast feature associated with a broadcasting service configured to broadcast graphical content output by a post-build version of the software application. An event synchronization component of the development computing system detects the changed state of the broadcast feature and, based on the changed state, alters the running of the software application in the pre-build preview state.

18 Claims, 8 Drawing Sheets

(56) References Cited

U.S. PATENT DOCUMENTS

| | | |
|---|---|---|
| 9,588,760 B1 | 3/2017 | Bostick et al. |
| 2008/0148230 A1 | 6/2008 | Kemmler |
| 2012/0324418 A1 | 12/2012 | Fallon |
| 2014/0073350 A1* | 3/2014 | Kim .................. H04W 4/025 455/456.1 |
| 2015/0099588 A1 | 4/2015 | Lavery |

OTHER PUBLICATIONS

"Interactive Reference Documentation", Retrieved from: <<https://dev.mixer.com/reference/interactive/index.html>>, Retrieved Date: Nov. 24, 2017, 16 pages.

"Mixer—Interactive Livestreaming", Retrieved from: <<https://mixer.com/?sandbox=xdks.1>>, Retrieved Date: Nov. 24, 2017, 2 pages.

"Performance—interactive-cpp", Retrieved from: <<https://github.com/mixer/interactive-cpp/wiki/Performance>>, Aug. 29, 2017, 2 pages.

"Performance—interactive-unity-plugin", Retrieved from: <<https://github.com/mixer/interactive-unity-plugin/wiki/Performance>>, Aug. 29, 2017, 2 Pages.

\* cited by examiner

EVENT SYNCHRONIZATION FOR DEVELOPMENT COMPUTING SYSTEM

CROSS REFERENCE TO RELATED APPLICATIONS

This application claims priority to U.S. Provisional Patent Application Ser. No. 62/575,936, filed Oct. 23, 2017, the entirety of which is hereby incorporated herein by reference for all purposes.

BACKGROUND

Some software applications, especially video games, output graphical content that can be broadcast to interested viewers over a computer network. In some cases, such a broadcast may include one or more broadcast features enabling viewers of the broadcast to interact with the software application itself. As an example, a broadcast feature may allow a viewer to provide a bonus to one or more players or teams participating in a video game or e-sports competition.

DETAILED DESCRIPTION

Software application development can be complicated and time consuming, especially as software applications become more sophisticated and involve more Internet-connected external services. For example, many developers of video game software are responsible for developing not only the code for their video game, but also various network features that are supplemental to the core game experience and are hosted by external services. As used herein, a "network feature" generally refers to an application, process, tool, widget, etc., that can be accessed over a network by one or more external users or devices to review or interact with data provided by a software application. In the context of a video game, such network features can include leaderboards, achievements/trophies, online matchmaking functions, broadcast features, etc. In many cases, these network features are built on platforms and using tools that are separate from the development environment that the developer uses to maintain the core game code. Furthermore, it is often desirable for a single game to support multiple different network platforms, meaning it is often necessary to develop multiple different versions of the same network feature. This added complexity can significantly increase the time and effort required to build software applications, especially during testing of changes.

In an example scenario, a video game developer may decide to modify an existing network feature. This will likely involve accessing an external service hosting the network feature, using tools provided by the external service to modify the network feature, and waiting potentially several hours for the changes to propagate and become live. In many cases, before the modified network change can be tested, the developer must also make changes to core game code related to the modified network feature using their own development environment, separate from the external service. This often requires a lengthy and resource-intensive compile step to produce an updated build of the game. Only after this lengthy process is complete can the developer test their changes. Should the developer conclude that additional changes are necessary, the above process must be repeated, requiring potentially large amounts of time for what could amount to a trivial bug fix.

One specific type of network feature is a broadcast feature. A "broadcast feature" as used herein is typically any application, process, tool, widget, etc., provided to viewers of a broadcast of graphical content output by a software application (e.g., a video game). Broadcast features often allow broadcast viewers to interact with the software application itself. For example, while watching two players compete in a video game environment, a viewer may use a broadcast feature to provide a specific player with a temporary bonus. In this scenario, both players are running a video game application created by a particular developer, and graphical content provided by the video game application is being broadcast over the Internet via a network-based broadcasting service. Viewers can watch the gameplay by accessing the broadcasting service, which hosts the broadcast features that allow the viewers to interact with the running video game application. Should the developer wish to test a change to the broadcast feature, they will likely need to edit the video game software, wait for a new build of the video game software to compile, edit the broadcast features hosted on the broadcasting service, then wait for those changes to propagate and go live, all before changes can be tested.

Accordingly, the present disclosure is directed to techniques for facilitating rapid iteration in software application development. Specifically, the present disclosure describes a development computing system including an application development component, a broadcast feature editing component, and an event synchronization component. The application development component may, for instance, include a set of processes and tools useable to create and maintain software application code, assets, and/or resources, and may in some cases be specific to a particular programming language, game development engine, etc. Similarly, the broadcast feature editing component can be any software usable to build and maintain broadcast features associated with a software application, and is often specific to a particular broadcasting service on which the finished broadcast features will be hosted. The event synchronization component, meanwhile, functions as an interface between the application development component and broadcast feature editing component, and is configured to coordinate operations by the application development component and broadcast feature editing component.

Using such a computing system, both the software application and broadcast features can be edited locally, and key operations performed by the application development component (e.g., starting or stopping a preview, changing files, compiling software, terminating a process) can be communicated to the broadcast feature editing component, and vice versa, via the event synchronization component. In other words, the event synchronization component bridges the developer's local application development component and development tools associated with the external network service, allowing the developer to more effectively test changes at both locations in tandem. In some examples, the increased integration between the application development component and broadcast feature editing component can allow for near-instantaneous local testing of changes, without requiring lengthy compile or publish steps, and using real network-provided data. This can significantly improve the developer's ability to rapidly iterate and test changes to their application, which can improve the efficiency of the software development process at all levels.

The present disclosure primarily focuses on software applications taking the form of video games that work in tandem with some number of externally-hosted network features meant to enhance the video game experience, for players and/or viewers. However, it will be understood that the herein-described techniques can be used to facilitate the development of any suitable software application that incorporates one or more broadcast or other network features. For example, the application development iteration techniques described herein could be applied in the realm of educational software, in which students remotely view and interact with a live lecture, robotics software, in which a robot firmware and remote control interface are developed in tandem, remote operated surgical robotics, etc. In other words, a "software application" useable with "network features" may refer to any computer software that produces at least some content accessible remotely via a network service using network features or tools hosted on the network service.

Furthermore, the present disclosure primarily focuses on broadcast features that are hosted on broadcasting services. As discussed, a broadcast feature is a specific variety of network feature that often facilitates viewer interaction with a broadcast of graphical content. Similarly, a broadcasting service is a specific variety of network service that hosts network features—namely, a service that facilitates broadcasting and remote viewing of graphical content output by a software application. Though the present disclosure primarily focuses on broadcast features and broadcasting services, it will be understood that the herein-described techniques may be applied to any suitable network features and services. Accordingly, the development iteration techniques described herein may be applied to any network feature paired with any software application, and accessed via any network service.

As indicated above, in some cases a broadcast feature can take the form of a viewer control provided as part of a video game broadcast experience. Many video game broadcast services allow individual players, groups of players, professional leagues, etc., to broadcast graphical output of a video game application to interested viewers over the Internet. Such viewers often have some ability to interact with players of the video game and/or with the video game software itself by manipulating viewer controls included as part of a user interface displayed to the viewers. Examples of viewer controls include chat interfaces, voting buttons, interactive maps, inventory screens, statistics viewers, etc. By interacting with viewer controls in a user interface, viewers may affect the video game application by, for example, altering one or more properties or variables of the video game application, thereby affecting how the video game application is executed. Other viewer controls may, for example, allow a viewer to access and review data associated with the video game application, thereby allowing the viewer to view statistics, inventory screens, maps, item locations, current objectives, etc.

Figure 1:
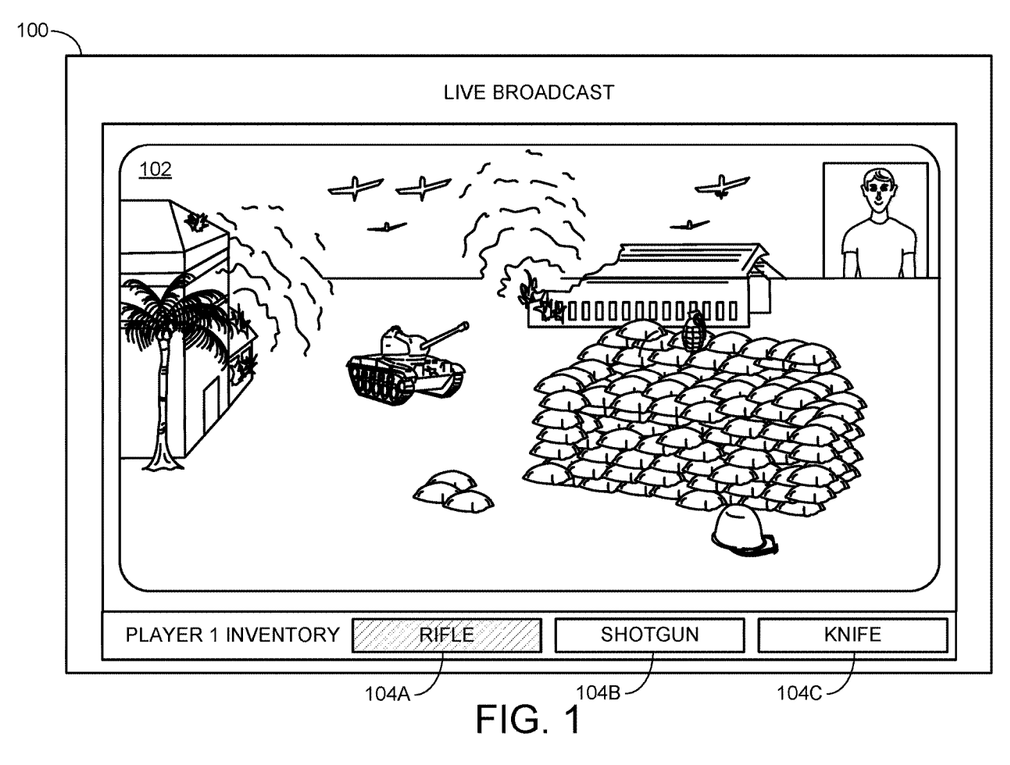
FIG. 1 depicts an example of a gameplay broadcast including broadcast features.

An example user interface 100 presented to a viewer of a video game broadcast is shown in FIG. 1. User interface 100 includes graphical content 102 output by a video game application. Specifically, FIG. 1 illustrates a broadcast of video gameplay, which may, for example, be provided by a single individual playing a game on their own personal device, a group of individuals playing a game hosted on a network-based server, professional competitors playing a video game while located in a real-world arena, and/or any other suitable party. In many cases, and as is shown in FIG. 1, gameplay broadcasting may be facilitated by an Internet-accessible broadcasting service, or other network service (e.g., a service maintained by a hardware manufacturer of a gaming device, a software developer of a video game application, an organization hosting a video game competition, a $3^{rd}$ party streaming service), and transmitted to interested viewers along with one or more broadcast features that allow viewers of the broadcast to interact with players of the video game and/or the video game itself.

In FIG. 1, graphical content 102 is accompanied by broadcast features 104A-104C. In this example, the broadcast features allow viewers of the video game broadcast to manage the inventory of a player participating in the video game. Specifically, selection of broadcast feature 104A causes the video game application providing the graphical content to automatically change the player's equipped item to a "rifle." Similarly, selection of broadcast features 104B or 104C changes the player's equipped item to a "shotgun" or "knife," respectively. In other examples, viewer selection of one of the broadcast features 104A may not immediately change the player's equipped item. Rather, selection of one of the broadcast features 104 may amount to a suggestion to the player of an item that the viewer believes the player should equip. In a different example, selection of one of the broadcast features 104 may constitute a vote for the item that the viewer believes the player should use. Upon a particular item receiving a majority of the votes cast by viewers, it may be automatically equipped. Alternatively, the item with the most votes may be automatically equipped once an in-game condition or threshold is met (e.g., the start of a new match), or the player may simply be provided a notification indicating which item a majority of viewers voted for. It will be understood that broadcast features, such as those shown in FIG. 1, may function in any suitable way.

The user interface shown in FIG. 1, including the graphical content produced by the video game application as well as the broadcast features, are presented as examples and are not limiting. In other examples, a user interface may include more/fewer/different components and interactable elements, having any suitable sizes and positions. Similarly, broadcast features may be manipulated/interacted with in any suitable way, and can be used to provide any suitable input to a video game player and/or video game application. Furthermore, when the software application providing output for remote viewing is not a video game application, other broadcast features may be used besides the broadcast features shown in FIG. 1.

Figure 2:
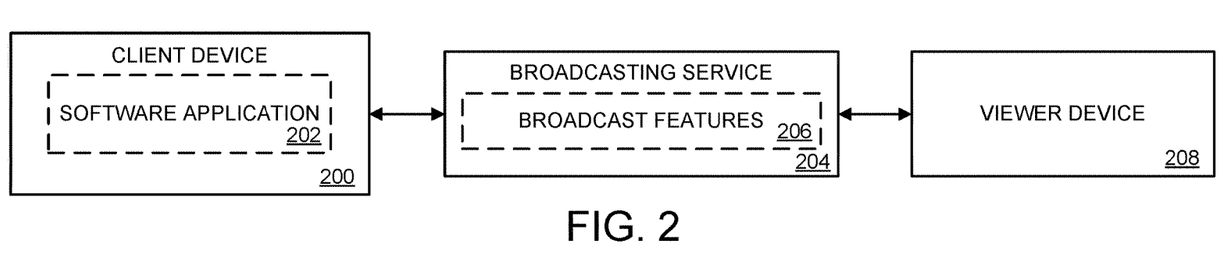
FIG. 2 illustrates interaction between a software application, a broadcasting service hosting broadcast features, and a viewer device.

FIG. 2 schematically illustrates how a software application, such as the video game application of FIG. 1, may interact with a network service (i.e., broadcasting service) hosting one or more network features (e.g., broadcast features), such as broadcast features 104. Specifically, FIG. 2 shows a client device 200 running a software application 202. Client device 200 may be any suitable network-accessible computing device including, for example, a video game console, a laptop computer, desktop computer, smartphone, tablet, wearable computing device, augmented/virtual reality computing device, server computer, etc. In some examples, client device 200 may be implemented as computing system 900 described below with respect to FIG. 9.

As described above, software application 202 may be any suitable software application that outputs graphical content that can be accessed or viewed by one or more remote devices or users. The present disclosure generally uses the example of a video game application, however other types of software applications are also within the scope of this disclosure.

As shown, software application 202 is communicatively coupled with a broadcasting service 204 hosting one or more broadcast features 206. As indicated above, a broadcasting service may take any suitable form and may be provided by any suitable party. Similarly, the broadcast features may be any features, tools, processes, widgets, applications, etc., useable by external users or devices to access or interact with the output of a software application running on the client device. In the context of a video game application, a broadcasting service can include any number of broadcast features and/or other network features, including multiplayer-specific features (e.g., rules/algorithms for matchmaking), leaderboards, statistics aggregators, trophies/ achievements, interface controls such as those described above with respect to FIG. 1, etc.

FIG. 2 also shows interaction between broadcasting service 204 and a viewer device 208. As discussed above, broadcast features hosted by a broadcasting service may allow one or more external devices or users to access or interact with data associated with a software application running on a client device. Using the example of FIG. 1, viewer device 208 may be a personal device belonging to a viewer of the video game broadcast that is rendering user interface 100 based on data provided by the broadcasting service. In other words, broadcasting service 204 may take output provided by software application 202 (e.g., graphical output from a video game), pair it with the broadcast features, and provide it to the viewer device.

As shown in FIG. 2, a division typically exists between the software application and the broadcast features associated with the software application, in that the broadcast features may be hosted by a broadcasting service that is distinct from the client device running the software application. This provides some advantages, as it allows the core software application to enjoy a degree of platform independence, and support multiple different broadcasting services, provided those services include similar network features. In fact, the tools useable for building broadcast features on a given broadcasting service are frequently provided by the broadcasting service itself, allowing the developer to build the core software application, then build complementary broadcast features on any broadcasting services they would like the software application to support.

However, as discussed above, this can also introduce inefficiencies and bottlenecks into the development process, particularly with regard to testing of changes or workflows involving multiple updates. In a typical development environment, schematically illustrated in FIG. 3, a developer will often make use of a personal development computing system 300 equipped with an application development component 302 to build the source code, assets, resources, etc., of a software application 304. Often this software application will be stored in a pre-build state (e.g., non-compiled source code and assets). The application development component will often include one or more computer programs, shells, interpreters, tools, etc., which may often correspond to specific programming languages or video game development engines. In some cases, the application development component may be configured to run all or part of the software application in a preview state, allowing the developer to test changes to the game code without compiling a new build.

Figure 3:
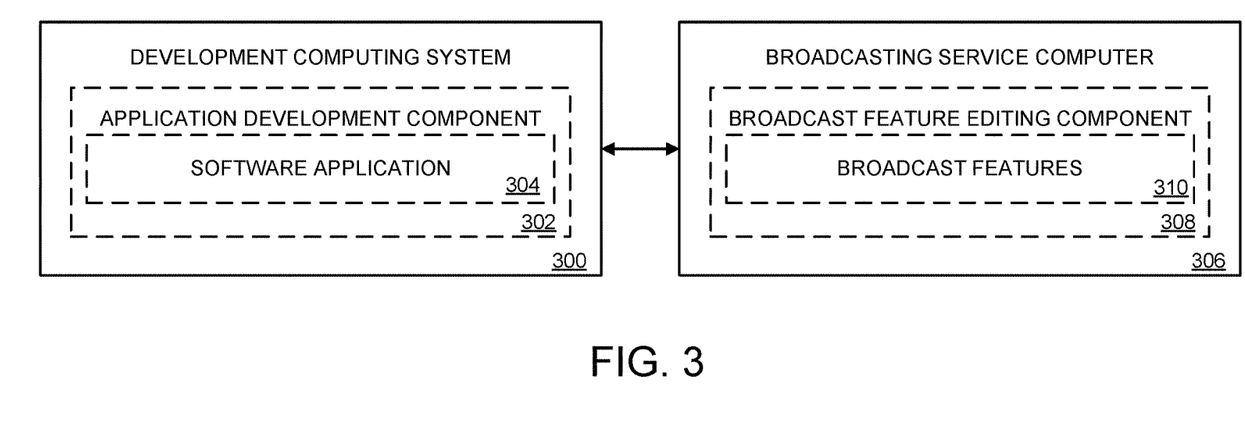
FIG. 3 schematically shows an example development computing system interacting with a broadcasting service.

To build the broadcast features, the developer will often access a broadcast feature editing component 308 of one or more broadcasting service computers 306 of a broadcasting service. This broadcast feature editing component can be used to build broadcast features 310 that interact with the software application. Practically, this can include logging on to a development platform provided by the network service, from which the developer can specify or change rules for multiplayer matchmaking; add/modify leaderboards, achievements, or rewards; add or change statistics monitoring or aggregation features; design or modify broadcast features for video game broadcast scenarios; etc.

However, the environment illustrated in FIG. 3 is not always conducive to rapid iteration with regard to modifying broadcast features. Network services often include an arbitrarily large number of different servers and other network infrastructure that are in more or less constant use and are only taken offline infrequently and when necessary. Accordingly, when a developer makes a change to a broadcast feature using the broadcast feature editing component, it can take potentially several hours for the change to propagate throughout the broadcasting service and become visible to the developer. Similarly, changing a broadcast feature often requires making modifications to the core software application code itself, to ensure that the software application supports the modified feature. Depending on the nature of the developer's own application development component, testing interactions between the software application and the modified broadcast feature often requires that the software application be in a compiled state (as opposed to running in a pre-build preview mode within the application development component). Compiling a software application of any significant size often requires several hours.

In other words, before a feature change can be tested, a developer is often required to update their software application code on their own development computing system, which involves compiling a new build of the application, and also update the broadcast feature itself on the broadcasting service, which takes an unpredictable length of time to become live. If, after the developer has had an opportunity to test their changes, the developer decides that subsequent changes are necessary, the above process must be repeated, requiring additional compile and publish steps. Using this workflow, even simple changes to broadcast features can take an entire day to apply and test, most of which is spent simply waiting for software to compile or network changes to propagate. This problem is exacerbated by the fact that the developer's application development component and the network service's broadcast feature editing component are often located on different computing systems, and therefore ignorant as to the other's operations.

Figure 4:
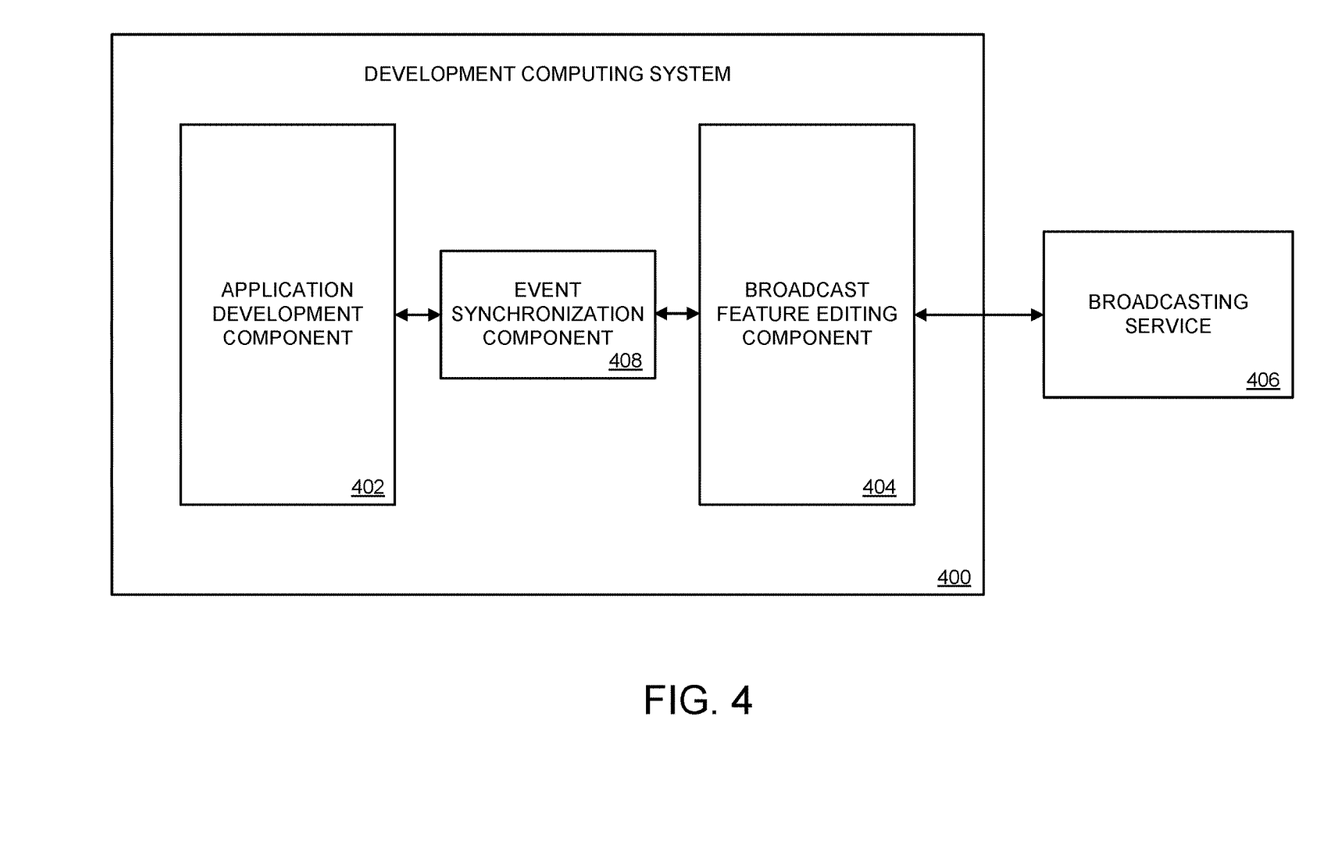
FIG. 4 schematically shows a different example development computing system interacting with a network service.

Accordingly, FIG. 4 schematically illustrates an example development computing system 400 useable to develop both software applications and broadcast features associated with those software applications. Development computing system 400 may include any suitable hardware and/or software components, and in some cases, may be implemented as a desktop computer, laptop computer, smartphone, tablet, wearable device, augmented/virtual reality device, etc. Development computing system may be implemented as computing system 900 described below with respect to FIG. 9.

Development system 400 includes an application development component 402 that, as with application development component 300 of FIG. 3, will typically include one or more computer programs, shells, interpreters, tools, etc., useable to build and maintain software application code, application, and/or other resources. The application development component may in some cases be configured to support one or more specific programming languages or video game development engines.

Development computing system 400 also includes a broadcast feature editing component 404. In this case, the broadcast feature editing component includes a collection of software and tools that are stored locally on the development computing system, such software and tools being useable to build and edit broadcast features that cooperate with a software application. In some cases, broadcast feature editing component 404 may be used to modify network features that are hosted by a remote network service. As shown in FIG. 4, broadcast feature editing component 404 is communicatively coupled with broadcasting service 406. This enables communication back and forth between the development computing system and broadcasting service, allowing the development computing system to retrieve or modify data (e.g., broadcast features) located at the broadcasting service.

In some cases, the development computing system may maintain local copies of files that represent the broadcast features, and automatically synchronize changes to these local copies with the network service. Further, communication with the network service allows the development computing system to retrieve real network-provided data from the network service. This can be beneficial during testing of software applications and network features, for example allowing the developer to test how a leaderboard or statistics aggregator functions when provided with real data from players around the world.

Development computing system 400 also includes an event synchronization component 408, configured to interface with the application development component and broadcast feature editing component. Specifically, the event synchronization component is configured to monitor operations of both the application development component and supplemental broadcast feature editing component. This can include, for example, monitoring system processes of the development computer system, using plugins or Application Programming Interfaces (APIs) to access data, watching for changes to a local file system, etc.

In some examples, the event synchronization component may coordinate operations of both the application development component and broadcast feature editing component. For example, as discussed above, the application development component may be configured to run all or part of a software application in a pre-build, preview state. Similarly, the broadcast feature editing component may be configured to present broadcast features in a pre-production, preview mode. In some cases, the event synchronization component may be configured to convey user interaction with one preview to a different preview. In an example scenario, a developer may be testing a broadcast feature taking the form of a virtual joystick that allows viewers to temporarily control the software application (e.g., control a player-character in a video game). Upon detecting interaction with a pre-production preview of this broadcast feature in the broadcast feature editing component, the event synchronization component can capture the detected input and provide it to a pre-build preview of the software application running in the application development component, causing the software application preview to respond just as if a post-build software application had received a real viewer input from the broadcasting service.

Figure 5:
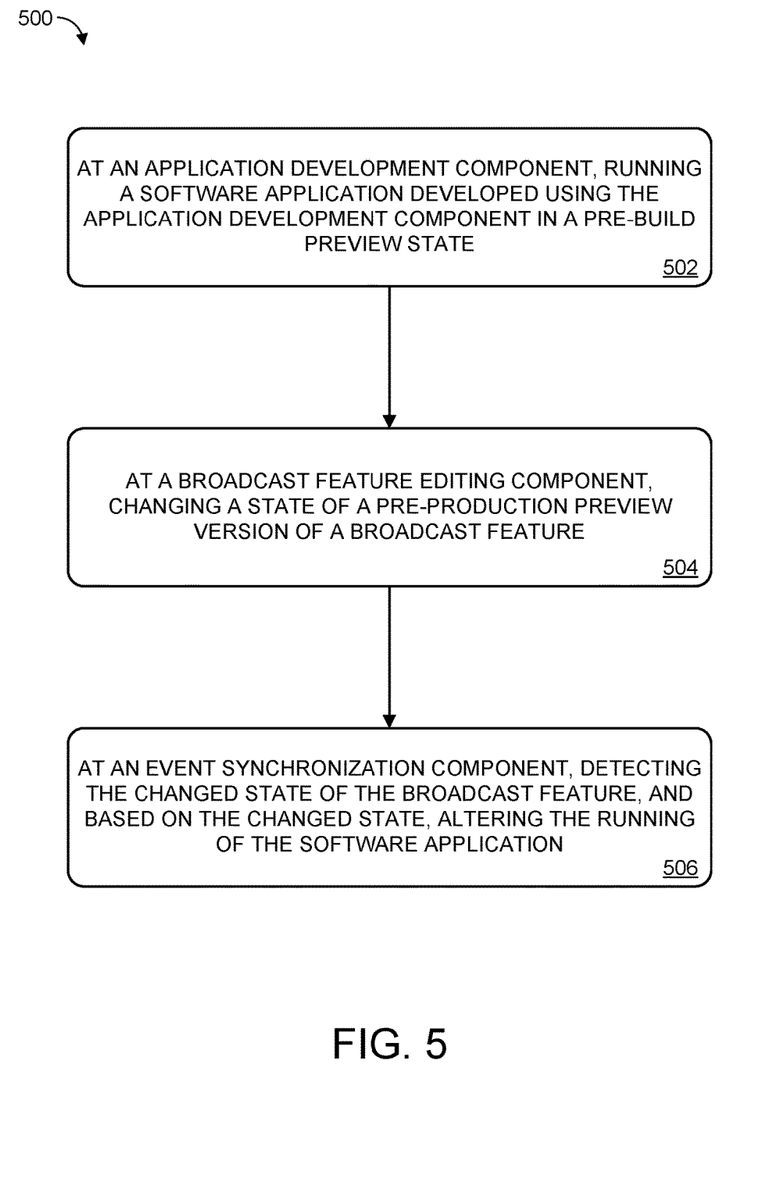
FIG. 5 illustrates an example method for application development iteration.

Coordination between the application development and broadcast feature editing components via the event synchronization component will now be discussed in more detail with respect to FIG. 5. FIG. 5 illustrates an example method 500 for application development iteration. Method 500 may be implemented on any suitable computer hardware, including a desktop computer, laptop computer, mobile computing device (e.g., smartphone or tablet), augmented/virtual reality computing device, server computer, etc. In some cases, method 500 may be implemented on computing system 900 described below with respect to FIG. 9.

At 502, method 500 includes, at an application development component of a development computing system, running a software application developed using the application development component in a pre-build preview state. As discussed above, this may involve running all or part of the software application in the application development component without first compiling the software application assets and source code. This can enable the developer to rapidly test changes to the application code, though has drawbacks as compared to running the application in a post-build state. For instance, typically a pre-build preview version of a software application will be unable to communicate with a network service or interact with live broadcast features.

At 504, method 500 includes, at a broadcast feature editing component of the development computing system, changing a state of a pre-production preview version of a broadcast feature. As used herein, the term "pre-production preview version" refers to a broadcast feature that is locally stored and maintained/presented/rendered by the broadcast feature editing component, as opposed to a production version of the broadcast feature that is hosted by a network service and is actively network-accessible.

In some cases, the broadcast feature editing component may present a pre-production preview version of a broadcast feature that already exists on the broadcasting service—e.g., for testing how the developer's changes will affect existing features. In other words, the production version of the broadcast feature is manipulable by viewers of a broadcast to alter running of a post-build version of the software application, while the pre-production preview version only exists on the development computing system, and is only visible to the developer.

Additionally, or alternatively, the broadcast feature editing component may present pre-production preview versions of broadcast features that are being actively developed or that otherwise have never existed on the network service. For example, the developer may use the broadcast feature editing component to create a new broadcast feature, then view and interact with a pre-production preview version of that broadcast feature.

In any event, the pre-production preview version of the broadcast feature is represented by computer files stored locally by the development computing system. Such computer files may take any suitable form. For instance, the broadcast feature may be represented by Hypertext Markup Language (HTML) files, Cascading Style Sheets (CSS) files, JavaScript Object Notation (JSON) files, and/or computer files having any other suitable type. Furthermore, in some cases, a remote copy of these computer files may be stored on the broadcasting service (e.g., the production version of the broadcast feature, or an in-development version of the broadcast feature), and the broadcast feature editing component may synchronize changes to the locally-stored computer files with the broadcasting service.

Changing a state of a pre-production preview version of a broadcast feature can refer to a variety of potential operations performed by the broadcast feature editing component. In a typical example, the broadcast feature editing component will render and display to the developer a preview of what the broadcast feature will look like to viewers watching a broadcast of graphical content output by a post-build version of the software application (i.e., a pre-production preview of the broadcast feature). Thus, the developer may interact with the pre-production preview just as a viewer would interact with a production version of the broadcast feature while watching a broadcast. In this scenario, changing the state of the broadcast feature can include the developer interacting with the broadcast feature just as a user would, for instance by actuating virtual buttons, manipulating a virtual joystick, panning or zooming on an environment map, etc.

In some cases, testing of the broadcast feature may be enhanced when the broadcast feature editing component incorporates real software application usage data provided by the broadcasting service. For example, as indicated above, when testing a broadcast feature taking the form of a statistics aggregator, it may be desirable for the statistics aggregator to use real data generated via players actually playing the video game, as opposed to static data pulled from a default test file.

Additionally, or alternatively, changing the state of a pre-production preview version of a broadcast feature can include modifying the locally-stored computer files that represent the computer file. For instance, the developer may make a change to the appearance or coding of the broadcast feature, or delete the broadcast feature entirely.

Continuing with FIG. 5, at 506, method 500 includes, at an event synchronization component of the development computing system, detecting the changed state of the broadcast feature, and based on the changed state, altering the running of the software application in the pre-build preview state. This can occur in a variety of different ways, depending on the nature of the changed state of the broadcast feature.

In one example, the broadcast feature is a virtual joystick that allows a viewer to change the position of a player-character ordinarily controlled by a broadcasting player. Accordingly, when the developer changes the state of the pre-production preview version of the broadcast feature (i.e., by manipulating the virtual joystick), the event synchronization component may instruct the application development component to change the position of a player-character within a game environment of the software application running in the pre-build preview state. In a different example, the broadcast feature may allow a viewer to provide a player-character with a bonus, powerup, ability, etc. Accordingly, altering the running of the software application in the pre-build preview state can include providing a bonus to the player character. In yet another example, the broadcast control may allow viewers to change a player-character's inventory. Accordingly, altering the running of the software application in the pre-build preview state can include changing the inventory of the player-character based on the changed state of the broadcast feature.

It will be understood that the above scenarios are provided as examples, and that the running of the software application in the pre-build preview state may be altered in any number of ways, depending on the specific broadcast feature being tested, and the specific way in which the state of the broadcast feature is changed. For example, as discussed above, in some cases changing the state of the broadcast feature can include modifying or deleting the locally-stored files associated with the broadcast feature. In response, the event synchronization component may instruct the application development component to change and/or delete application assets and/or code pertaining to the broadcast feature, thereby altering how the software application runs in the pre-build preview state.

Furthermore, the event synchronization component may detect the changed state of the pre-production preview version of the broadcast feature in any suitable way. In some examples, the event synchronization component may be a command-line executable service configured to scan for changes to a local filesystem, analyze how local applications allocate and manipulate data stored in memory, subscribe to events reported by software applications on the development computing system (e.g., the application development and broadcast feature editing components), read and/or write data maintained by other applications via an API, and/or generally monitor local data manipulated by software on the development computing system. In other examples, the event synchronization component may take other suitable forms, and detect broadcast feature state changes in other suitable ways, depending on the operating system and software environment of the development computing system.

Figure 6:
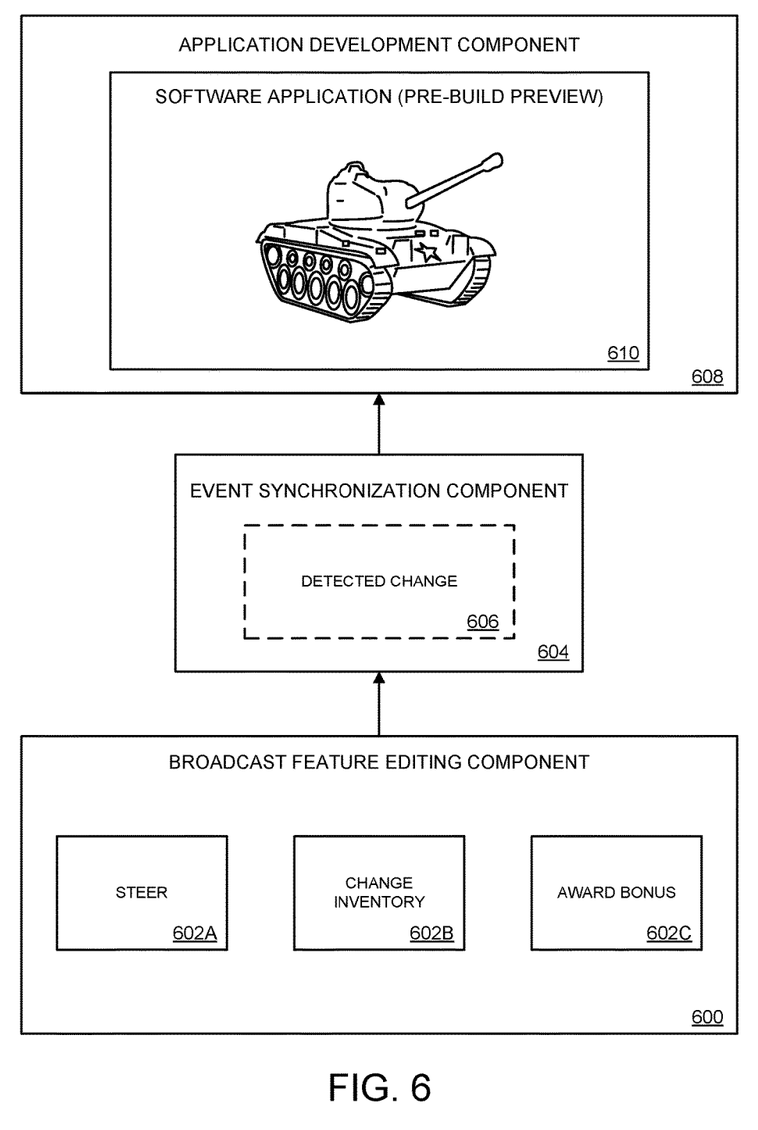
FIG. 6 schematically illustrates detection of a change in state of a broadcast feature by an event synchronization component.

FIG. 6 schematically shows an example broadcast feature editing component 600 including several pre-production preview versions of broadcast features 602A-602C. As discussed above, broadcast feature 602A can change the position of a player-character in a game environment, while broadcast feature 602B can change the player-character's inventory, and broadcast feature 602C can award a bonus to the player character. It will be understood that the appearances and functions of these broadcast features are examples, and that broadcast features may be presented in any suitable way and have any suitable functions.

FIG. 6 also schematically shows an example event synchronization component 604, which has detected a change in state 606 of one or more of the pre-production preview broadcast features 602A-602C. Based on the change in state, the event synchronization component coordinates with an application development component 608 to alter the running of a pre-build, preview version of a software application 610. As discussed above, altering the running of the software application may be done in any number of ways, depending on the specific software application and broadcast features in question, and how the state of the broadcast feature was changed.

Notably, absent the event synchronization component, manipulation of pre-production preview broadcast features of the broadcast feature editing component would have no effect on the software application running in the pre-build preview state. Rather, as discussed above, the broadcast feature editing and application development components are separate pieces of software, often associated with different services and frequently running on different computing systems. Thus, while the broadcast feature editing component enables creating, editing, and testing of broadcast features, such broadcast features would ordinarily have no effect on the running of a pre-build preview software application in a separate piece of software (i.e., the application development component). It is only through use of the event synchronization component that the development iteration advantages described herein are achieved.

Though the above description focused on changes in state of a broadcast feature affecting a software application running in a pre-build preview state, it will be understood that, additionally or alternatively, changes in the running of the software application can alter the state of a pre-production preview broadcast feature. This will be described with respect to FIG. 7, which illustrates another example method 700 for application development iteration. As with method 500, method 700 may be implemented on any suitable computer hardware, including a desktop computer, laptop computer, mobile computing device (e.g., smartphone or tablet), augmented/virtual reality computing device, server computer, etc. In some cases, method 700 may be implemented on computing system 900 described below with respect to FIG. 9.

Figure 7:
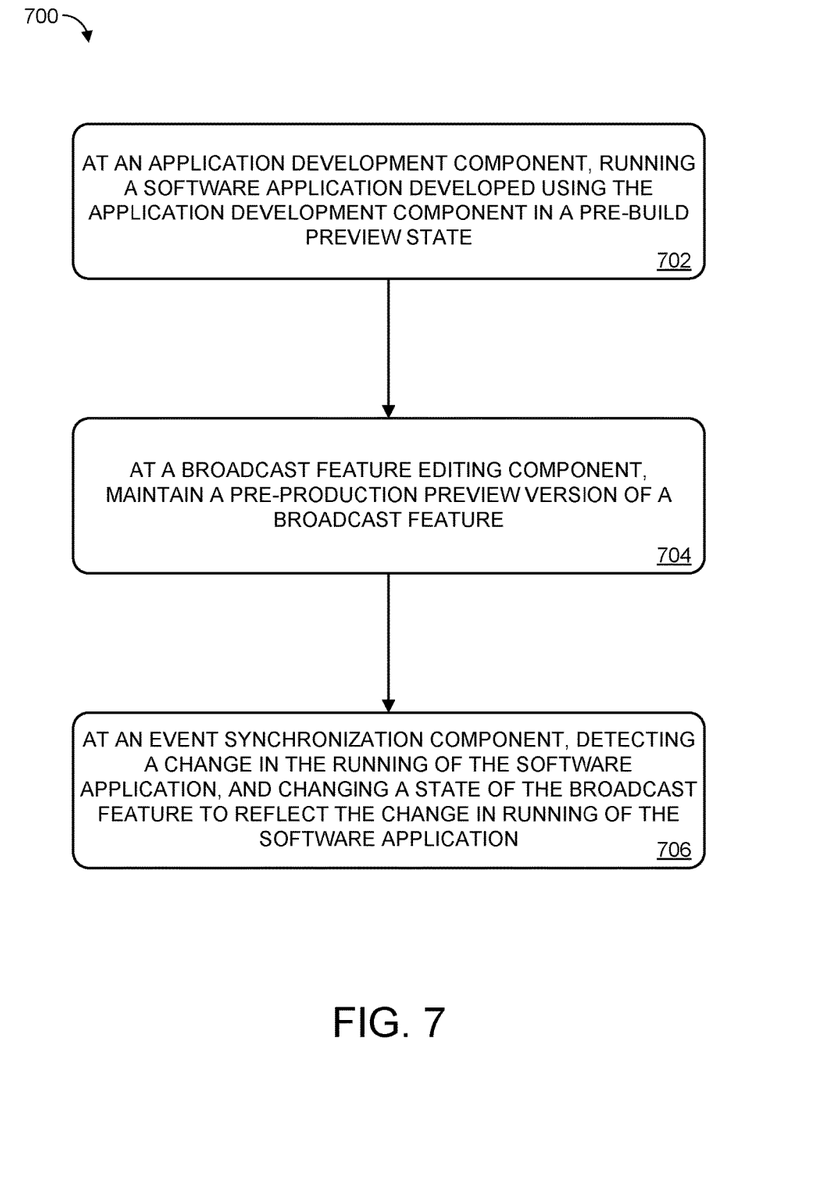
FIG. 7 illustrates another example method for application development iteration.

At 702, method 700 includes, at an application development component of a development computing system, running a software application developed using the application development component, the software application running in a pre-build preview state. At 704, method 700 includes, at a broadcast feature editing component of the development computing system, maintaining a pre-production preview version of a broadcast feature. Both steps 702 and 704 may be done substantially as discussed above.

Continuing with FIG. 7, at 706, method 700 includes, at an event synchronization component of the development computing system, detecting a change in the running of the software application in the pre-build preview state, and changing a state of the broadcast feature to reflect the change in running of the software application. For example, when the broadcast feature is a statistics aggregator, and an event occurs in the pre-build preview version of the application that affects one or more of the aggregated statistics, the event synchronization component may instruct the broadcast feature editing component to update the state of the statistics aggregator to reflect the change. In other examples, other changes to the running of the software application can have other effects on broadcast features of the broadcast feature editing component, depending on the specific circumstances.

The event synchronization component may detect the change in running of the software application in any suitable way. For example, as discussed above, the event synchronization component may detect the change by watching for changes to a local filesystem, analyzing local data stored in memory, subscribing to application events, receiving updates via an API, etc.

Figure 8:
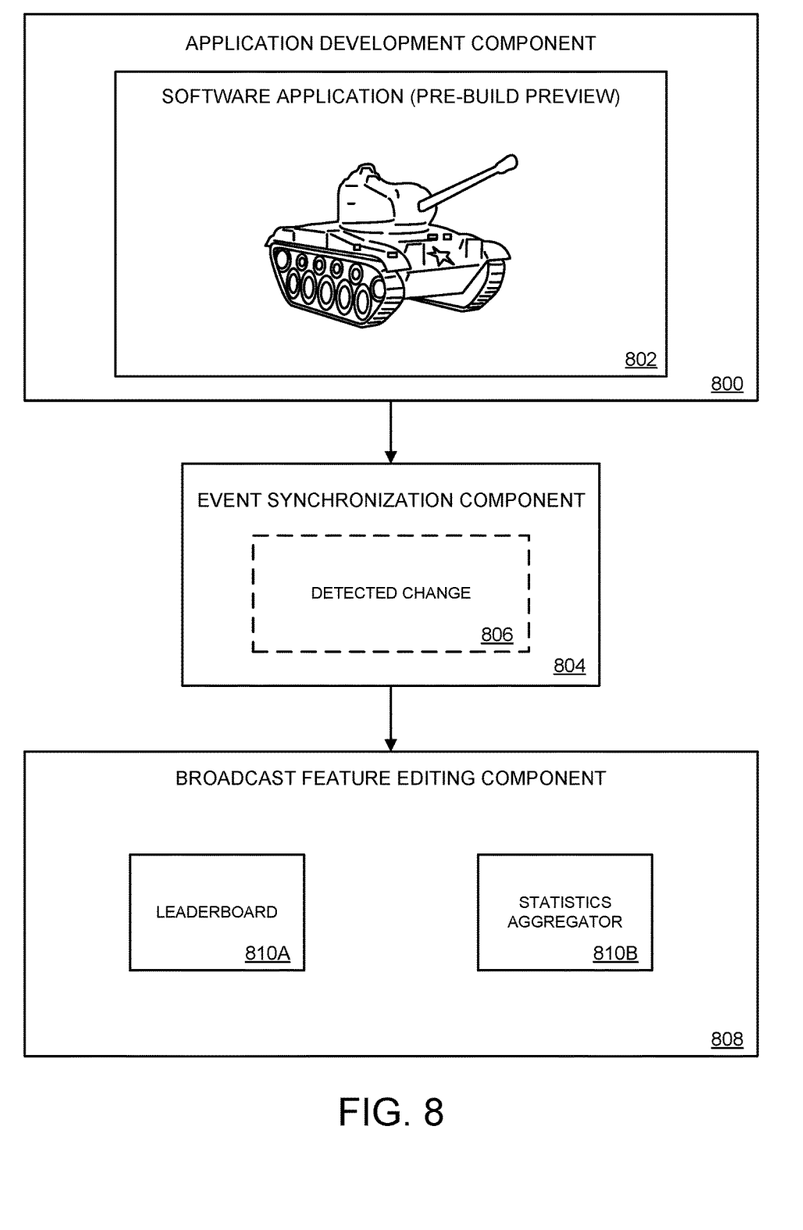
FIG. 8 schematically illustrates detection of a change in the running of a software application in a pre-build preview state by an even synchronization component.

FIG. 8 schematically shows another example application development component 800 running an example software application 802 in a pre-build preview state. FIG. 8 also schematically shows an example event synchronization component 804, which has detected a change 806 in the running of the software application, and instructs a broadcast feature editing component 808 to update the state of a broadcast feature. For example, the broadcast feature editing component may update a leaderboard broadcast feature 810A to reflect a player-character's win/loss, or a statistics aggregator 810B to reflect an updated number of enemies defeated, shots fired, distance travelled, etc. It will be understood that the specific broadcast features shown in FIG. 8 are examples, and are not limiting.

It will be understood that any suitable event or operation performed by either of the application development and broadcast feature editing components may be detected by the event synchronization component, and this can have any suitable effect, even beyond altering of the state or behavior of preview software applications or broadcast features. For example, events detectable by the event synchronization component can include: software starts compiling, software finishes compiling, a user requests to save their work, a preview is generated, a specific action is taken within a preview, a new process is started or stopped, a program is shut down, etc.

In response to detecting one or more of these events, the event synchronization component may take any suitable action. As examples, when the event synchronization component detects that a user is saving their work in the application development component, the broadcast feature editing component can also be instructed to save its changes. Similarly, if the broadcast feature editing component is in the process of shutting down, though the application development component still needs access to data from the broadcast feature editing component, the broadcast feature editing component can be instructed to pause its shutdown as the application development component finishes processing. When a user begins a preview of a software application in the application development component, the event synchronization component can instruct the broadcast feature editing component to also begin a preview of the network feature controls. These actions performed by the event synchronization component are presented as examples, and it will be understood that the event synchronization component may coordinate operations between the application development and broadcast feature editing components in a variety of suitable ways.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
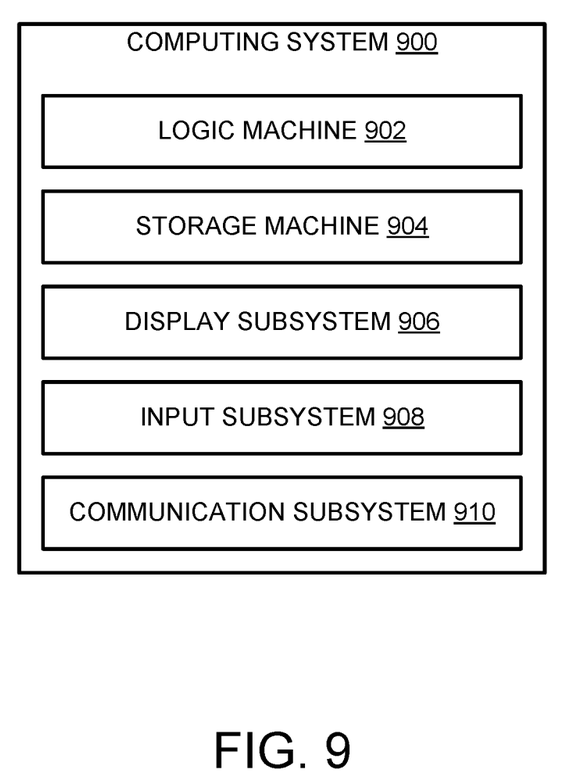
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a method for application development iteration comprises: at an application development component of a development computing system, running a software application developed using the application development component in a pre-build preview state; at a broadcast feature editing component of the development computing system, changing a state of a pre-production preview version of a broadcast feature associated with a broadcasting service configured to broadcast graphical content output by a post-build version of the software application; and at an event synchronization component of the development computing system, detecting the changed state of the broadcast feature, and based on the changed state, altering the running of the software application in the pre-build preview state. In this example or any other example, the software application is a video game. In this example or any other example, altering the running of the software application in the pre-build preview state includes altering a position of a player-character within a game environment of the video game. In this example or any other example, altering the running of the software application in the pre-build preview state includes providing a bonus to a player-character. In this example or any other example, altering the running of the software application in the pre-build preview state includes changing an inventory of a player-character. In this example or any other example, the broadcast feature editing component incorporates real software application usage data provided by the broadcasting service. In this example or any other example, a production version of the broadcast feature is manipulable by viewers of the broadcast to alter running of the post-build version of the software application. In this example or any other example, computer files representing the pre-production preview version of the broadcast feature are locally stored by the development computing system. In this example or any other example, the broadcast feature editing component synchronizes changes to the computer files representing the pre-production preview version of the broadcast feature with the broadcasting service. In this example or any other example, the event synchronization component is a command-line executable service. In this example or any other example, the event synchronization component detects the changed state of the pre-production preview version of the broadcast feature via monitoring of local data manipulated by the broadcast feature editing component.

In an example, a method for application development iteration comprises: at an application development component of a development computing system, running a software application developed using the application development component in a pre-build preview state; at a broadcast feature editing component of the development computing system, maintaining a pre-production preview version of a broadcast feature associated with a broadcasting service configured to broadcast graphical content output by a post-build version of the software application; and at an event synchronization component of the development computing system, detecting a change in the running of the software application in the pre-build preview state, and changing a state of the broadcast feature to reflect the change in running of the software application. In this example or any other example, the software application is a video game. In this example or any other example, the broadcast feature is a leaderboard. In this example or any other example, the broadcast feature is a gameplay statistics aggregator. In this example or any other example, the broadcast feature editing component incorporates real software application usage data provided by the broadcasting service. In this example or any other example, the event synchronization component is a command-line executable service. In this example or any other example, computer files representing the pre-production preview version of the broadcast feature are locally stored by the development computing system. In this example or any other example, the event synchronization component detects the change in running of the software application via monitoring of local data manipulated by the application development component.

In an example, a development computing system comprises: an application development component configured to run a video game application developed using the application development component in a pre-build preview state; a broadcast feature editing component configured to facilitate editing and manipulation of pre-production preview versions of broadcast features associated with a broadcasting service, the broadcasting service configured to broadcast graphical content output by a post-build version of the video game application; and an event synchronization component configured to monitor local data manipulated by the broadcast feature editing component to detect a change in state of a broadcast feature of the broadcast feature editing component, and based on the changed state, alter the running of the video game application in the non-compiled preview state.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for application development iteration, comprising:
   at an application development component of a development computing system, running a software application developed using the application development component in a pre-build preview state;
   at a broadcast feature editing component of the development computing system, changing a state of a pre-production preview version of a broadcast feature associated with a broadcasting service configured to broadcast graphical content output by a post-build version of the software application to viewers to access and review the broadcast graphical content, where the broadcast feature editing component synchronizes changes to computer files representing the pre-production preview version of the broadcast feature with the broadcasting service, and wherein the viewers, who are not players, are enabled by a production version of the broadcast feature, when implemented with the post-build version of the software application, to temporarily control the post-build version of the software application normally controlled by players; and
   at an event synchronization component of the development computing system, detecting the changed state of the pre-production preview version of the broadcast feature, and based on the changed state, altering the running of the software application in the pre-build preview state, where the production version of the broadcast feature is manipulated by viewers of the broadcast, not as part of application development, to alter running of the post-build version of the software application by altering one or more properties or variables of the software application while the pre-production preview version of the broadcast feature only exists on the development computing system and is not visible to the viewers.

2. The method of claim 1, where the software application is a video game.

3. The method of claim 2, where altering the running of the software application in the pre-build preview state includes altering a position of a player-character within a game environment of the video game.

4. The method of claim 2, where altering the running of the software application in the pre-build preview state includes providing a bonus to a player-character.

5. The method of claim 2, where altering the running of the software application in the pre-build preview state includes changing an inventory of a player-character.

6. The method of claim 1, where the broadcast feature editing component incorporates real software application usage data provided by the broadcasting service.

7. The method of claim 1, where computer files representing the pre-production preview version of the broadcast feature are locally stored by the development computing system.

8. The method of claim 1, where the event synchronization component is a command-line executable service.

9. The method of claim 1, where the event synchronization component detects the changed state of the pre-production preview version of the broadcast feature via monitoring of local data manipulated by the broadcast feature editing component.

10. A method for application development iteration, comprising:

at an application development component of a development computing system, running a software application developed using the application development component in a pre-build preview state;

at a broadcast feature editing component of the development computing system, maintaining a pre-production preview version of a broadcast feature associated with a broadcasting service configured to broadcast graphical content output by a post-build version of the software application to viewers to access and review the broadcast graphical content, where the broadcast feature editing component synchronizes changes to computer files representing the pre-production preview version of the broadcast feature with the broadcasting service, and wherein the viewers, who are not players, are enabled by a production version of the broadcast feature, when implemented with the post-build version of the software application, to temporarily control the post-build version of the software application normally controlled by players; and at an event synchronization component of the development computing system, detecting a change in the running of the software application in the pre-build preview state, and changing a state of the pre-production preview version of the broadcast feature to reflect the change in running of the software application, where the production version of the broadcast feature is manipulated by viewers of the broadcast, not as part of application development, to alter running of the post-build version of the software application by altering one or more properties or variables of the software application while the pre-production preview version of the broadcast feature only exists on the development computing system and is not visible to the viewers.

11. The method of claim 10, where the software application is a video game.

12. The method of claim 11, where the broadcast feature is a leaderboard.

13. The method of claim 11, where the broadcast feature is a gameplay statistics aggregator.

14. The method of claim 10, where the broadcast feature editing component incorporates real software application usage data provided by the broadcasting service.

15. The method of claim 10, where the event synchronization component is a command-line executable service.

16. The method of claim 10, where computer files representing the pre-production preview version of the broadcast feature are locally stored by the development computing system.

17. The method of claim 10, where the event synchronization component detects the change in running of the software application via monitoring of local data manipulated by the application development component.

18. A development computing system, comprising: a memory;

an application development component configured to run a video game application developed using the application development component in a pre-build preview state;

a broadcast feature editing component configured to facilitate editing and manipulation of a pre-production preview version of a broadcast feature associated with a broadcasting service, the broadcasting service configured to broadcast graphical content output by a post-build version of the video game application to viewers to access and review the broadcast graphical content, where the broadcast feature editing component synchronizes changes to computer files representing the pre-production preview version of the broadcast feature with the broadcasting service, and wherein the viewers, who are not players, are enabled by a production version of the broadcast feature, when implemented with the post-build version of the video game application, to temporarily control the post-build version of the video game application normally controlled by players; and an event synchronization component configured to monitor local data manipulated by the broadcast feature editing component to detect a change in state of the pre-production preview version of the broadcast feature, and based on the changed state, alter the running of the video game application in the pre-build preview state, where the production version of the broadcast feature is manipulated by viewers of the broadcast, not as part of application development, to alter running of the post-build version of the video game application by altering one or more properties or variables of the video game application while the pre-production preview version of the broadcast feature only exists on the development computing system and is not visible to the viewers.

* * * * *